T. WHITE.
SHAFT OR PULLEY COUPLING.
APPLICATION FILED MAR. 23, 1909.
943,209.
Patented Dec. 14, 1909.
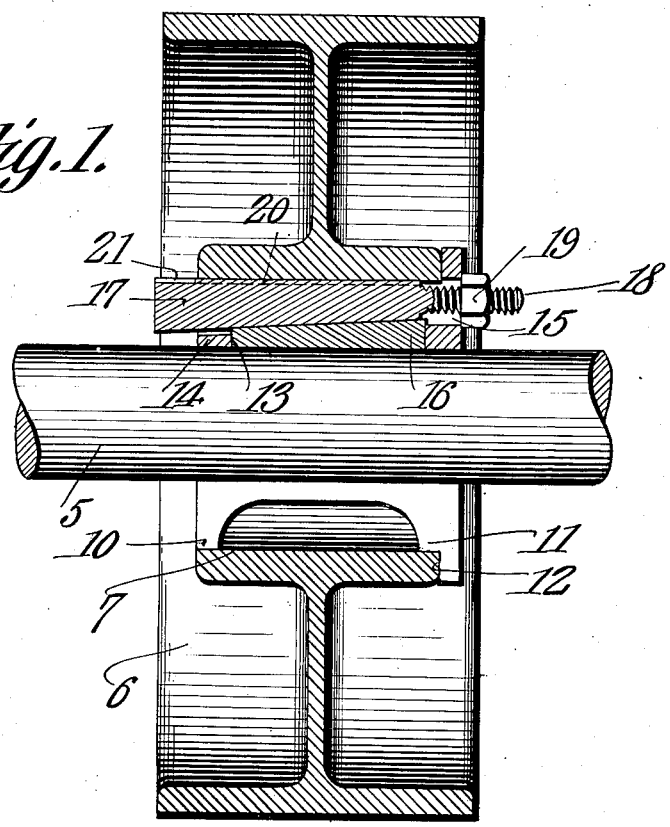
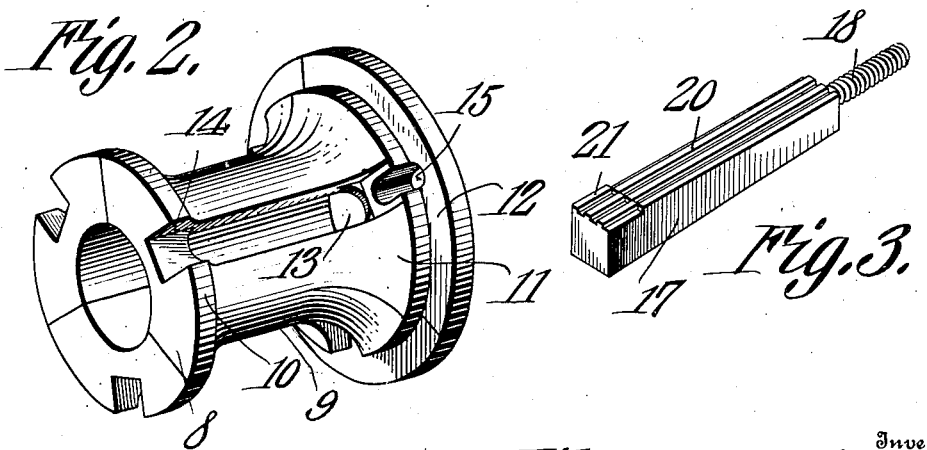
Witnesses
Inventor
Tilman White.
By C. A. Snow & Co.
Attorneys

UNITED STATES PATENT OFFICE.

TILMAN WHITE, OF PORTLAND, OREGON.

SHAFT OR PULLEY COUPLING.

943,209.  Specification of Letters Patent.  Patented Dec. 14, 1909.

Application filed March 23, 1909. Serial No. 485,253.

*To all whom it may concern:*

Be it known that I, TILMAN WHITE, a citizen of the United States, residing at Portland, in the county of Multnomah and State of Oregon, have invented a new and useful Shaft or Pulley Coupling, of which the following is a specification.

The object of the present invention is to provide a simple and inexpensive coupling upon which a pulley or gear may be slipped and very securely held to a shaft at the desired points and without the necessity of forming a key receiving groove in the shaft.

The coupling embodying the present invention is of that type and very similar to the coupling shown and described in my prior patent #681,090, August 20, 1901, the coupling disclosed in which patent is comprised of coupling segments each carrying coöperating wedges one of which is adjustable to cause the other to bear firmly against the shaft upon which the coupling is mounted and the present invention aims to improve the construction of the adjustable wedge by so forming one surface of the frame as to limit the adjustment of the said wedge in one direction so as to prevent the wedge from sliding through beyond its working position while the parts of the coupling are being adjusted and clamped upon the shaft.

Another improvement involved in the present form of coupling over the form shown in my prior patent as above stated, resides in cutting away the outer circumferential surface of the coupling segments whereby to reduce the cost of the coupling and the material and work necessary for its production, this cutting away of the said surface of the coupling segments being accomplished without taking from the segments any of their functions.

In the accompanying drawings, Figure 1 is a vertical sectional view through a pulley and showing the same fixed upon a shaft by means of one of the couplings embodying the present invention. Fig. 2 is a detail perspective view of the segments of the coupling showing the same in assembled relation, and Fig. 3 is a detail perspective view of one of the adjustable wedges of the coupling.

In the drawings, there is shown a shaft 5 and a pulley 6 which is fixed upon the shaft by means of the coupling embodying the present invention.

As shown in the drawings, the bore of the hub of the pulley indicated by the numeral 7, is of a greater diameter than the shaft 5.

The coupling embodying the invention is comprised in part of a plurality of segments each of which is indicated by the numeral 8 and has its outer or convex surface cut away between its ends as indicated by the numeral 9, this cutting away of the said surface of each segment resulting in end flanges 10 and 11 the flange 10 being located at one end of the segment and the flange 11 at the other end thereof, and at this last mentioned end of each segment, there is formed, in addition to the flange 11, a flange 12 which projects radially beyond the flange 11 and forms an abutment against which seats one end of the hub 7 of the pulley 6, it being understood that the several segments or sections of the coupling are to be assembled so as to form a substantially cylindrical bushing such as is shown in Fig. 2 of the drawings and that this bushing is inserted in the hub of the pulley with the flanges 12 abutting against one end of the said pulley hub as heretofore stated.

It will be observed from an inspection of Fig. 2 of the drawings that each of the segments 8 is formed with a longitudinally extending slot 13 and that the flanges 10 are formed each with a notch 14 communicating or opening into the slot 13 and that the flanges 12 and 11 are formed with a short radial slot 15 opening also into the respective slot 13. As shown in Fig. 1 of the drawings, there is disposed, in each of the slots 13, a wedge-shaped block 16, the major end of which is presented toward that end of the bushing at which the flanges 12 are formed. After the segments of the bushing have been assembled about the shaft 5 and in the hub of the pulley 6 and the wedges 16 have been disposed in their respective slots 13 in the said segments 8, an adjusting wedge 17 is inserted through the notch 14 in the flange 10 of each segment 8 and is formed at its minor end, which end is presented in the direction of that end of the bushing at which the flange 12 is formed, with a threaded stud 18 which projects through the slots 15 in the flanges 11 and 12. Upon the stud 18 of each adjusting wedge 17 is threaded an adjusting nut 19 and this nut bears against that end of the respective segment 8 at which the flanges 11 and 12 are formed, so that when it is tightened, the adjusting wedge 17 will be drawn in the direction of the said end of the segment and will exert a wedging action against the corresponding wedge 16.

As shown in Figs. 1 and 3 of the drawings, the adjusting wedge 17 has that face which bears against the wall of the bore of the hub of the pulley formed with a plurality of ribs 20 which extend longitudinally of the said face of the wedge and from the minor end to a point adjacent the major extremity of the said wedge and throughout the remainder of the length of the said face of the adjusting wedge, it is formed with shorter ribs 21 which are alternately arranged with respect to the ribs 20. It will be readily understood that the ribs 20 and 21, bite into the wall of the bore of the hub and thereby prevent, effectually, rotation of the pulley with respect to the bushing. It will be understood of course that by providing several of the segments or in other words by forming the bushing in several sections and providing upon each section a wedge adjustment, wedging action will be inserted between the shaft and pulley at a plurality of equi-distantly located points so that by comparative careful adjustment the pulley may be exactly centered with respect to the shaft. It will further be understood that by arranging the ribs 21 alternately with respect to the ribs 20, such degree of frictional engagement will be had between the rib faces of the wedges and the wall of the bore of the hub 7, when the ribs 20 and 21 are all contacting with the surface of the said wall of the hub of the bore, as will effectually prevent the adjusting wedges dropping through the notches and openings to too great a degree when the parts of the device are being assembled upon the shaft.

What is claimed is:—

1. In a device of the class described, a body formed with a slot and to embrace a shaft, a wedge fitted in the slot in the body and bearing against the shaft, and an adjusting wedge carried by the body and coöperating with the first mentioned wedge, the said adjusting wedge having a face to engage with the wall of a hub bore, the said face of the said adjusting wedge being provided with alternately arranged long and short ribs.

2. In a device of the class described, a body formed with a slot and to embrace a shaft, a wedge fitted in the slot in the body and bearing against the shaft, and an adjusting wedge carried by the body and coöperating with the first mentioned wedge, the said adjusting wedge having a face to engage with the wall of a hub bore, long ribs formed upon the said face and shorter ribs formed upon the face and arranged in staggered relation with respect to the long ribs.

3. In a device of the class described, a body formed with a slot and to fit a shaft, a wedge disposed in said slot and bearing against the shaft, the body being formed at one end with a flange and the flange being formed with an opening, a wedge disposed upon the first mentioned wedge and held in position thereon by the body, the last mentioned wedge being formed with a threaded stud projecting through the opening in the flange, a nut threaded upon the stud and bearing against the flange and adjustable to draw the said last named wedge in the direction of the flange, the wedge being formed upon its face opposite to that one which bears against the first mentioned wedge with ribs extending from that end at which the stud is formed to a point adjacent the opposite end of the wedge and with shorter ribs extending from the said opposite end of the wedge to the point of termination of the first mentioned ribs at the respective end, the shorter ribs being alternated with the first mentioned ribs.

In testimony that I claim the foregoing as my own, I have hereto affixed my signature in the presence of two witnesses.

TILMAN WHITE.

Witnesses:
N. CAMPBELL,
GEO. W. MORGAN.